(12) United States Patent
Smith et al.

(10) Patent No.: US 6,858,068 B2
(45) Date of Patent: Feb. 22, 2005

(54) DEVICE FOR PROVIDING MICROCLIMATE CONTROL

(75) Inventors: Douglas M. Smith, Albuquerque, NM (US); Kevin H. Roderick, Albuquerque, NM (US)

(73) Assignee: Nanopore, Inc., Albuquerque, NM (US)

( * ) Notice: Subject to any disclaimer, the term of this patent is extended or adjusted under 35 U.S.C. 154(b) by 0 days.

(21) Appl. No.: 10/672,479

(22) Filed: Sep. 26, 2003

(65) Prior Publication Data

US 2004/0060444 A1 Apr. 1, 2004

Related U.S. Application Data

(60) Provisional application No. 60/415,150, filed on Sep. 30, 2002.

(51) Int. Cl.[7] .................. B01D 53/04; B01D 53/26; F28F 7/00; F25D 23/12
(52) U.S. Cl. .............. 96/127; 2/81; 62/259.3; 62/530; 96/135; 96/142; 96/153; 165/46; 165/902
(58) Field of Search .................. 96/108, 118, 121, 96/126, 127, 134, 135, 139, 140, 142, 147, 153, 154; 2/81; 62/259.3, 293, 530; 95/117, 126; 165/46, 902

(56) References Cited

U.S. PATENT DOCUMENTS

| | | | |
|---|---|---|---|
| 3,212,286 A | * 10/1965 | Curtis ................. 62/259.3 |
| 3,390,511 A | 7/1968 | Norton ................. 55/35 |
| 3,734,293 A | * 5/1973 | Biskis ................. 210/185 |
| 3,779,936 A | 12/1973 | Pearce et al. ................. 252/194 |
| 4,444,727 A | * 4/1984 | Yanagihara et al. ........ 422/223 |
| 4,580,408 A | * 4/1986 | Stuebner ................. 62/259.3 |
| 4,826,516 A | 5/1989 | Matsuoka et al. ........... 55/388 |
| 4,856,294 A | 8/1989 | Scaringe et al. ........... 62/259.3 |
| 5,000,252 A | * 3/1991 | Faghri ................. 165/10 |
| 5,048,301 A | 9/1991 | Sabin et al. ................. 62/101 |
| 5,111,668 A | * 5/1992 | Parrish et al. ............. 62/259.3 |
| 5,113,666 A | 5/1992 | Parrish et al. ............. 62/259.3 |
| 5,115,859 A | 5/1992 | Roebelen, Jr. et al. ........ 165/10 |
| 5,201,365 A | 4/1993 | Siegel ................. 165/46 |
| 5,214,926 A | 6/1993 | Mandin et al. ............. 62/54.2 |
| 5,268,022 A | * 12/1993 | Garrett et al. ................. 95/98 |
| 5,289,695 A | 3/1994 | Parrish et al. ............. 62/259.3 |
| 5,291,750 A | 3/1994 | Parrish et al. ............. 62/259.3 |
| 5,386,701 A | 2/1995 | Cao ................. 62/259.3 |
| 5,415,222 A | 5/1995 | Colvin et al. ................. 165/46 |
| 5,624,477 A | * 4/1997 | Armond ................. 95/96 |
| 5,689,968 A | 11/1997 | Frustaci et al. ............. 62/259.3 |
| 5,935,304 A | 8/1999 | Shelley et al. ................. 96/118 |
| 6,047,106 A | * 4/2000 | Salyer ................. 392/341 |
| 6,083,418 A | * 7/2000 | Czarnecki et al. ............ 252/70 |
| 6,125,645 A | 10/2000 | Horn ................. 62/259.3 |
| 6,189,327 B1 | 2/2001 | Strauss et al. ............. 62/259.3 |
| 6,257,011 B1 | * 7/2001 | Siman-Tov et al. ........ 62/259.3 |
| 6,276,155 B2 | 8/2001 | Siman-Tov et al. ........ 62/259.3 |
| 6,298,907 B1 | 10/2001 | Colvin et al. ................. 165/46 |

(List continued on next page.)

FOREIGN PATENT DOCUMENTS

GB          573880          12/1945

*Primary Examiner*—Robert H. Spitzer
(74) *Attorney, Agent, or Firm*—Marsh Fischmann & Breyfogle LLP

(57) ABSTRACT

A device for adsorbing water vapor from a gas stream. The device can be incorporated with an enclosure or garment in such a manner so as to enable water vapor to be adsorbed, thereby decreasing the relative humidity in the micrlimate surrounding the user. The water adsorption device is lightweight, has a high mass and volumetric energy capacity. A desiccant material is included within the water adsorption device to adsorb water vapor and a phase-change material is located in thermal communication with the desiccant to increase the loading capacity of the desiccant and maintain a cool gas stream by extracting the heat of adsorption from the desiccant.

17 Claims, 5 Drawing Sheets

U.S. PATENT DOCUMENTS

| | | | |
|---|---|---|---|
| 6,364,937 B1 * | 4/2002 | McMahon | 95/118 |
| 6,438,992 B1 | 8/2002 | Smith et al. | 62/480 |
| 6,463,212 B1 * | 10/2002 | Salyer | 392/341 |
| 6,503,297 B1 * | 1/2003 | Lu et al. | 95/96 |
| 6,559,096 B1 | 5/2003 | Smith et al. | 502/411 |
| 6,601,404 B1 | 8/2003 | Roderick | 62/480 |
| 2003/0150232 A1 * | 8/2003 | Brudnicki | 62/259.3 |

* cited by examiner

DEVICE FOR PROVIDING MICROCLIMATE CONTROL

CROSS-REFERENCE TO RELATED APPLICATIONS

This application claims priority to U.S. Provisional Patent Application No. 60/415,150 filed Sep. 30, 2002, entitled "DEVICE FOR PROVIDING MICROCLIMATE CONTROL", the disclosure of which is incorporated herein by reference in its entirety.

BACKGROUND OF THE INVENTION

1. Field of the Invention

The present invention relates to a device which dehumidifies a gas stream and has a relatively high water adsorption capacity. The device can be incorporated into a garment or enclosure and is adapted to cool the user of a garment by evaporative cooling and provide microclimate control to an enclosure.

2. Background of the Invention

Garments designed to cool users while they are wearing the garment are known in the art. Typically, cooling devices and/or materials are incorporated into a portion of the garment to achieve such cooling. For example, U.S. Pat. No. 6,298,907 by Colvin et al. discloses a vest incorporating micropouches which contain a phase-change material ("PCM") to cool a person wearing the vest. The micropouches are in thermal communication with the person wearing the vest and the PCM is selected such that as the body temperature of the person increases, the phase-change materials will change from a solid to a liquid phase at a selected temperature, thereby extracting heat from the individual at the selected phase-change temperature. Colvin et al. also discloses the use of air convection to cool the micropouches and further increase the efficiency of the vest.

However, phase-change materials have a relatively low cooling density for direct cooling of a person and typically have a phase change temperature significantly below body temperature (−37° C.). Moreover, PCMs are not effective where there is a possibility of vapor build up within the garment. For example, firemen, military and other public service personnel frequently use hazardous materials (Hazmat) suits when fighting fires and/or when undergoing biological and chemical warfare or corresponding training. Similar suits are also often used in an uncomfortably hot atmosphere, such as steel mills and deep mines and, as a result, the individual will often perspire significantly. The resulting perspiration can cause a rapid buildup of water vapor within the suit which lowers the user's rate of heat rejection. In the case of a sealed suit, the build-up of water vapor can cause visibility problems from condensation of the vapor on the user's visor. Physical and physiological discomfort may also result from the increased temperature of the suit and the build-up of perspiration on the user's skin and clothing.

U.S. Pat. No. 6,125,645 by Horn discloses the use of ice as a phase-change material within a garment to cool the individual. Aside from the impracticality of maintaining temperatures suitable to maintain the ice within the garment, ice has a low cooling density and has logistical disadvantages in that the ice must be available to the user at or near the hostile environment. Ice also cannot remove water vapor from the garment. In fact, as the ice melts, it will likely contribute to the humidification of the garment. The use of ice also suffers in that the user cannot control the rate of cooling within the garment.

In contrast to ice and phase-change materials, adsorption cooling can overcome many of these problems resulting in lighter or longer lasting cooling, simplified logistics, sustained visibility and controllability. The use of an adsorption cooler to cool air within a garment is disclosed in U.S. Pat. No. 6,601,404 by Roderick. Cooling loads from about 50W to about 500W for garment cooling applications and cooling temperatures of from about 10° C. to about 25° C. are disclosed.

U.S. Pat. No. 5,289,695 by Parrish et al. discloses a garment incorporating a desiccant. The desiccant adsorbs water generated during the wearing of the garment (e.g., perspiration) and is located adjacent to the outer surface of the garment or in a separate case. An open-cell thermal insulating layer is located opposite the exterior of the garment and adjacent to the desiccant to prevent heat from dissipating back toward the skin of the person wearing the garment. A phase-change material can be located between the users skin and the desiccant bed to enable thermal control within the garment by controlling the heat transfer to the adsorbent vest.

There remains a need for a lightweight water adsorption device for cooling an individual wearing a garment and/or controlling the micro-climate in an enclosure. It would be advantageous if the device could provide a high degree of water adsorption, thereby providing cooling and dehumidification, and did not require direct physical contact with the individual to accomplish the adsorption.

SUMMARY OF THE INVENTION

The present invention is directed to a device for adsorbing water vapor from a gas stream, and is also directed to a climate-controlled enclosure and a personal cooling device, each incorporating a device for adsorbing water vapor from a gas stream.

According to one embodiment, a device for adsorbing water vapor from a gas stream is provided. The device includes a gas stream inlet and a gas stream outlet and at least a first flow channel disposed between the inlet and the outlet. A desiccant is in vapor communication with the first flow channel and a phase-change material is in thermal communication with the desiccant. The device also includes means for moving the gas stream from the inlet to the outlet. As the gas stream moves from the inlet to the outlet, through the flow channel, the desiccant adsorbs water vapor from the gas stream. The phase-change material advantageously extracts heat that is generated by the desiccant during adsorption, thereby increasing the capacity of the desiccant and also reducing the amount of heat transferred to the gas stream.

The device can include a plurality of flow channels to enhance the water extraction capability of the device. The desiccant can be disposed within the flow channels or the desiccant can be a rigid structure that defines at least a first wall of the flow channel. The device can be encapsulated in an impermeable envelope before activation of the device. The means for moving the gas stream can include, for example, a fan.

According to another embodiment of the present invention, a climate-controlled enclosure is provided. The enclosure includes at least a first wall member defining an enclosed space and a water adsorption device in fluid communication with the enclosed space. The device includes a device inlet, a device outlet in fluid communication with the enclosed space, at least a first flow channel disposed between the device inlet and the device outlet, a desiccant in vapor communication with the first flow channel and a phase-change material in thermal communication with the desiccant. The device is adapted to adsorb water vapor from a gas stream and provide a dried gas stream to the enclosed space. The device can be disposed within the enclosed space or can be disposed outside of the enclosed space, so long as the device is adapted to provide a dried gas stream to the enclosed space.

According to another embodiment of the present invention, a personal cooling device is provided. The personal cooling device includes a garment adapted to be worn by a user and having an inlet adapted to receive a gas stream flow and pass the gas stream flow to an interior of the garment when worn by the user. A cooling device is in fluid communication with the garment interior and is adapted to provide a gas stream flow to the garment interior. The cooling device includes a cooling device inlet, a cooling device outlet adapted to provide the gas stream to the garment interior, at least a first flow channel disposed between the cooling device inlet and the cooling device outlet, a desiccant in vapor communication with the first flow channel and a phase-change material in thermal communication with the desiccant.

DETAILED DESCRIPTION OF THE INVENTION

Figure 1:
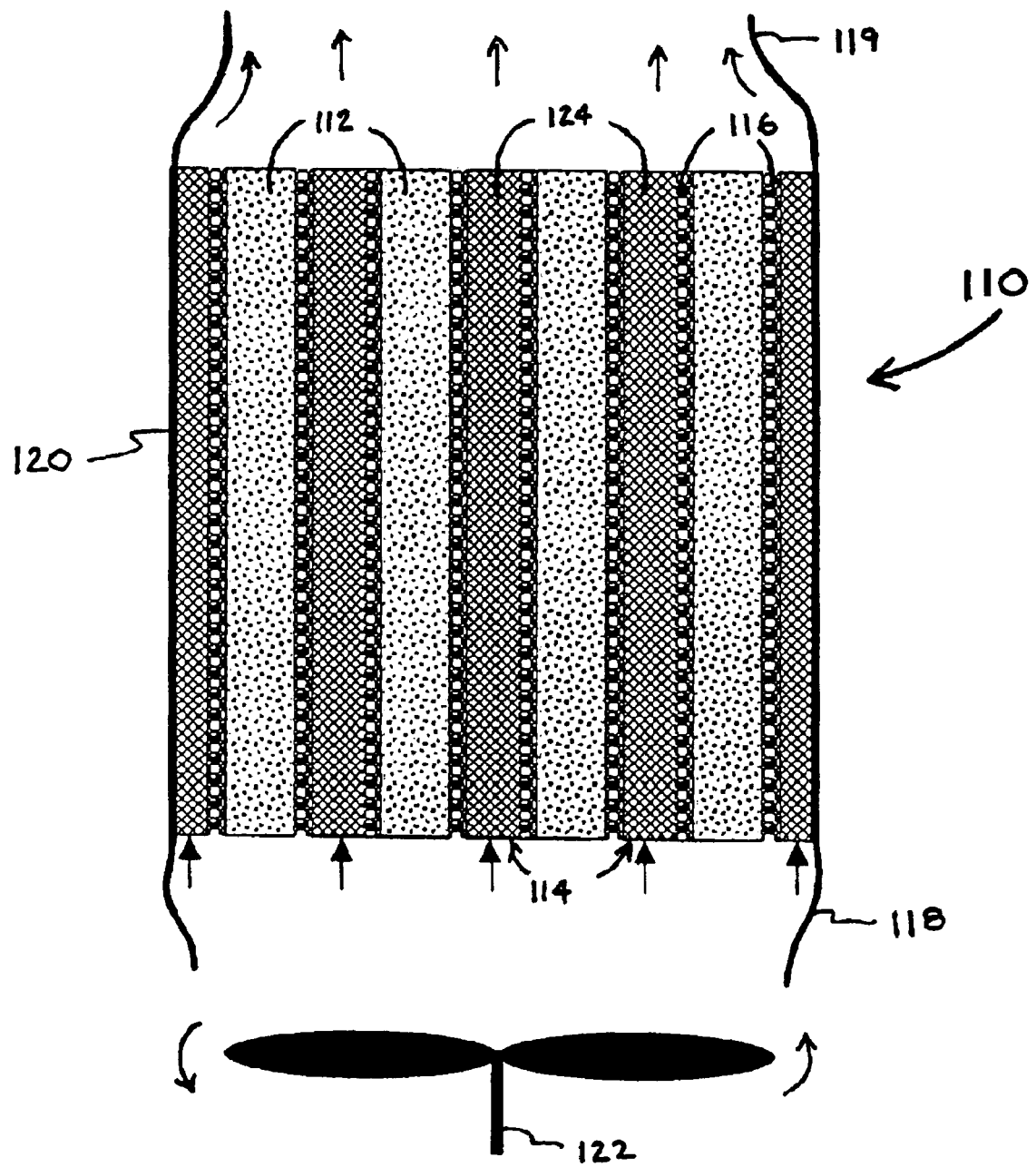
FIG. 1 illustrates a cross-section view of a water adsorption device according to an embodiment of the present invention.

The present invention provides an improved, lightweight water adsorption device that can adsorb water vapor from a gas stream. When incorporated with a garment, the device can cool a user wearing the garment by providing a dried gas stream to the user. The device of the present invention can provide a high degree of cooling over an extended period of time and can dehumidify self-contained micro-climates.

According to one embodiment of the invention, a water adsorption device includes a gas stream inlet, a gas stream outlet, a flow channel, a desiccant and a phase-change material. The desiccant is in vapor communication with the flow channel and the phase-change material is in thermal communication with the desiccant. The desiccant adsorbs water vapor contained in a gas stream that moves through the flow channel. The heat of adsorption generated by the desiccant is at least partially extracted from the desiccant by the phase-change material, thereby increasing the capacity of the desiccant and reducing the amount of heat transferred to the gas stream by the desiccant. The user is thereby provided with a cool, dry air stream. The device can also be implemented such that the adsorbed water vapor originates from the user (i.e., perspiration) to further cool the user due to an evaporative cooling effect.

The desiccant used within the water extraction device of the present invention can be any desiccant which is capable of adsorbing water vapor. Preferably, the desiccant has a high loading capacity. According to one embodiment, the desiccant is capable of adsorbing at least about 20 percent of its weight in water vapor, more preferably at least about 40 percent of its weight in water vapor and even more preferably at least about 60 percent of its weight in water vapor. More specifically, the preferred desiccant can adsorb at least about 20 percent of its weight in water at 10 percent relative humidity at ambient temperature (i.e., 25° C.), and at least 40 percent of its weight in water at 50 percent relative humidity at ambient temperature. More preferably, the desiccant will adsorb at least 40 percent of its weight at 10 percent humidity at ambient temperature and 60 percent of its weight at 50 percent relative humidity at ambient temperature. Even more preferably, the desiccant will adsorb at least about 60 percent of its weight at 10 percent humidity at ambient temperature and at least about 80 percent of its weight at 50 percent humidity at ambient temperature.

Suitable desiccants include zeolites, barium oxide, magnesium perchlorate, calcium sulfate, calcium oxide, activated carbon, modified carbon, calcium chloride, glycerin, silica gel, alumina gel, calcium hydride, phosphoric anhydride, phosphoric acid, potassium hydroxide, sodium sulfate, and combinations thereof. A particularly preferred desiccant in accordance with the present invention is a surface modified porous support material. The porous support material can be a material such as activated carbon or silica. Preferably, the porous support material has a pore volume of at least about 0.8 $cm^3/g$ and average pore size of from about 1 nm to about 20 nm. The surface modification can include impregnating the porous support material with one or more metal salts, such as a metal salt selected from the group consisting of calcium chloride, lithium chloride, lithium bromide, magnesium chloride, calcium nitrate, potassium fluoride and combinations thereof. The porous support material is preferably loaded with from about 20 to about 80 weight percent of the metal salt and more preferably from about 40 to about 60 weight percent of the metal salt. Such desiccant compositions are described in detail in U.S. Pat. No. 6,559,096 by Smith et al., which is incorporated herein by reference in its entirety. The desiccant may be in any suitable form so long as the desiccant is in vapor communication with the gas stream and thermal communication with the phase-change material. Suitable forms of desiccant include powders, granules and sheet form, such as a porous carbon sheet having a metal salt impregnated thereon.

To enhance adsorption rates, the desiccant can be activated prior to introduction into the water extraction device. Activation methods include heating the desiccant to remove moisture and/or any non-condensable gases.

As will be recognized by one of ordinary skill in the art, the manner in which the desiccant collects the water vapor is not important. As a result, the term adsorb, adsorption, adsorbing and the like are used herein to describe the process of either adsorption or absorption, as applicable.

The phase-change material preferably has a transition temperature of from about 10° C. to about 80° C. More preferably, the phase-change material has a transition temperature of at least about 25° C. It is desirable to utilize phase-change materials that have a transition temperature above ambient (e.g., 25° C.) to simplify the storage of such materials. As used herein, transition temperature refers to the temperature at which the phase-change material undergoes a phase-change, e.g., from a solid to a liquid.

The phase-change material should have a high energy density. The energy density may be measured in terms of mass (mass energy density) or volume (volumetric energy density). Mass energy density refers to the amount of energy that is released or adsorbed by the phase-change material per unit mass of the phase-change material. Volumetric energy density refers to the amount of energy that is released or adsorbed by phase-change material per unit volume of the phase-change material. It is important to note that as used herein the volumetric energy density refers not to the volumetric energy density of the phase-change material itself, but refers to the volumetric energy density of the phase-change material as incorporated into the water adsorption device. Preferably, the phase-change material has a volumetric energy density of at least about 200 J/cm$^3$, more preferably at least about 275 J/cm$^3$ and most preferably at least about 350 J/cm$^3$. The phase-change material should also have sufficient phase-change stability.

Preferred phase-change materials include inorganic compounds such as disodium sulfate decahydrate, disodium hypophosphate dodecahydrate, barium hydroxide octahydrate, paraffins such as octadecane, and combinations thereof. In order to provide a range of transition temperatures, it may be desirable to mix two or more phase-change materials. A phase-change additive may be added to the phase-change material to enhance its stability. Table 1 summarizes some examples of suitable phase-change materials, their transition temperatures and their mass and volumetric energy densities.

TABLE 1

| Phase-change Material | Transition Tmperature (° C.) | Cooling density (J/g) | Cooling density (J/cm$^3$) |
| --- | --- | --- | --- |
| $H_2O$ | 0 | 333 | 306 |
| $CaCl_2.6H_2O$ | 30 | 171 | 256 |
| $Na_2SO_4.10H_2O$ | 32 | 254 | 377 |
| $Na_2HPO_4.12H_2O$ | 35 | 281 | 405 |
| $Na_2S_2O_3.5H_2O$ | 48 | 201 | 322 |
| $NaCH_3COOH.3H_2O$ | 58 | 190 | 245 |
| $Ba(OH)_2.8H_2O$ | 78 | 267 | 581 |
| $C_{18}H_{38}$ | 28 | 244 | 189 |

In order to achieve a high energy density, the phase-change material is preferably prepared in such a way as to obtain a high packing density that is over 80% of the density of a single crystal. Means used to achieve this high density can include high-pressure uniaxial compaction, repeated infiltration of the crystals with saturated liquid solutions of the salt, and crystal habit modification during precipitation.

The desiccant and phase-change material are preferably proximal to each other in the water extraction device and in thermal communication such that the phase-change material can extract the heat of adsorption from the desiccant. This may be achieved by intersparsing the phase-change material in the desiccant or by placing the desiccant proximal to the phase-change material without interspersing, as described below.

It is not always desirable to mix the desiccant and the phase-change material, especially at or above the transition temperature of the phase-change material. When the phase-change material is in a liquid or gas phase, as is the case above its transition temperature, it may cause unwanted chemical reactions with the desiccant or lessen thermal communication with the desiccant by reducing the amount of phase-change material in contact with the desiccant. In such a case, a fluid diffusion barrier may be employed to prevent the phase-change material from contacting the desiccant or from changing its shape.

The fluid diffusion barrier can be any type of barrier which prevents the phase-change material from interspersing with the desiccant. Preferably, the fluid diffusion barrier also has a high thermal conductivity to enable efficient thermal communication between the desiccant and phase-change material. Preferred fluid diffusion barriers include simple plastic films such as polyethylene, nylon, PVC, metal foils with plastic heat seal layers such as those sold by Toyo Aluminum (Osaka, Japan), metallized plastic barriers such as those sold by DuPont (Wilmington, Del.) and Rexam (London, England), multilayer plastic layers and combinations thereof. In addition to preventing fluid diffusion, the phase-change material may be disposed within the fluid diffusion barrier to provide mechanical protection so that it retains its original shape and is resistant to physical or chemical changes in its structure. This may be accomplished by any means known in the art, including heat sealing.

The water adsorption device preferably has a low overall mass but has a high water adsorption capacity, and therefore, a high cooling capacity. When utilized to cool an enclosure such as a sealed garment, the amount of cooling produced from the cooling device is directly related to the amount of water vapor produced by the individual, such as from perspiration. The heat of vaporization of water, which can be used to reflect the cooling energy of the evaporation of perspiration from a body is 2250 J/g, or 0.63 W-hr/g. For an individual that produces 79 grams of perspiration per hour, 50 watts of cooling would be produced within the garment from the evaporation of the perspiration. For a desiccant composition that can adsorb its weight in water, such as that described in U.S. Pat. No. 6,559,096, 79 grams of desiccant would be required to adsorb all the evaporated perspiration. For a cooling rate of 50 watts, 180,000 joules of cooling is required to maintain the temperature of the desiccant. Assuming that the desiccant and phase-change material are at or near the transition temperature when the adsorption begins, 640 grams of a disodium hypophosphate dodecahydrate ($Na_2HPO_4.12H_2O$) phase-change material, 674 grams of a barium hydroxide octahydrate ($Ba(OH)_2.8H_2O$) phase-change material or 708 grams of a disodium sulfate decahydrate ($Na_2SO_4.10H_2O$) phase-change material would be required to achieve the 50 watts of cooling. The typical density of a carbon-based desiccant is about 0.5 g/cm$^3$. Given the above values and the information provided in Table 1, the total weight and volume of the desiccant and phase-change material can be calculated and are presented in Table 2. Higher or lower cooling rates and/or duration will change the mass and volume of the desiccant and the phase-change material proportionally.

TABLE 2

| Material | Weight (g) | Volume (cm$^3$) | Mass Cooling Capacity of Device (W-hr/kg) | Volumetric Cooling Capacity of Device (W-hr/l) |
| --- | --- | --- | --- | --- |
| Ice (for comparison) | 540 | 588 | N/A | N/A |
| $Na_2SO_4.10H_2O$ | 787 | 635 | 63.5 | 78.7 |
| $Na_2HPO_4.12H_2O$ | 709 | 602 | 70.5 | 83.1 |
| $Ba(OH)_2.8H_2O$ | 753 | 468 | 66.4 | 106.8 |

Preferably, the ratio of the cooling capacity of the water adsorption device to the combined weight of the desiccant and phase-change material is at least about 60 W-hr/kg. The ratio of the cooling capacity of the water adsorption device to the combined volume of the desiccant and phase-change material is preferably at least about 70 W-hr/l.

For a 50 W-hr cooling capacity, the combined weight of the desiccant and phase-change material in the water adsorption device is preferably not more than about 810 grams, more preferably not more than about 760 grams and most preferably not more than about 710 grams. Further, the combined volume of the desiccant and phase-change material in the water extraction device is preferably not greater than about 675 cm$^3$, more preferably not greater than about 610 cm$^3$ and most preferably not greater than about 550 cm$^3$ for 50 W-hr cooling capacity. Preferably, the mass ratio of desiccant to phase-change material, is not greater than about 0.10.

To efficiently remove the water vapor from the gas stream it is necessary to have sufficient mass transfer. Mass transfer may be improved by providing a high surface area to volume ratio of the desiccant. This can be achieved by providing multiple flow channels in the device. In the case of self-contained microclimates, it may be desirable to circulate the air within the sealed garment or enclosure. For instance, at temperatures near body temperature (37° C.), the moisture content of saturated air (i.e., a relative humidity of 100 percent) is at least about 50 g/m$^3$. Given this level of moisture content, only a small quantity of moisture-laden air is needed to circulate through the adsorption device to provide sufficient mass transfer of water to the desiccant surface to adequately cool the user. As a result, it is desirable to provide gas circulation means to increase mass transfer and therefore increase the cooling capacity of the device. Gas stream circulation means include natural convection and forced convection via movement of the user within the garment or the use of a device which creates a negative pressure differential across the device, such as a rotating fan that moves a gas stream through the flow channels.

The water adsorption device can also be encapsulated to provide mechanical protection. Preferably, the water adsorption device is encapsulated within a water impermeable envelope to prevent the adsorption of atmospheric water vapor prior to use. The water impermeable envelope can be made from a wide range of materials including simple plastic films such as polyethylene, nylon, PVC, metal foils with plastic heat seal layers such as sold those by Toyo Aluminum, metallized plastic barriers such as those available from DuPont and Rexam, multilayer plastic and combinations thereof. The water adsorption device may be encapsulated by the water impermeable envelope by any means known in the art, including heat sealing.

The water adsorption device may also include a thermal insulation material which encapsulates the device. With the use of phase-change materials that have relatively high transition temperatures, such as above 37° C. (normal body temperature), it is desirable to prevent the transfer of heat from the phase-change materials to the user to help prevent the user from increasing their body temperature. Therefore, the device can be disposed on the exterior of the garment or enclosure to isolate the device from the user so long as the outlet of the device is in fluid communication with the interior of the garment or the enclosed space. A thermal insulation material can also be used on the exterior of the device to restrict the flow of heat from the device. Preferably the thermal insulation has a low thermal conductivity, is lightweight and durable. Preferred materials suitable for use as the thermal insulation material may include, for example, polymer foams, such as expanded polystyrene and polyurethane, fiberglass and vacuum insulation panels.

The water adsorption device preferably includes one or more flow channels for directing the gas stream through the device. In one embodiment, a rigid, gas-permeable material is disposed between alternate desiccant layers that form the flow channels. In the case where the desiccant layer is in sheet form, as described above, there may be insufficient mass transfer to the desiccant layer due to the density of the sheet. It is therefore desirable to increase the mass transfer to this sheet. The use of a rigid, gas-permeable material located between the desiccant sheets enables such an increase in mass transfer. The gas-permeable material can be a woven plastic mesh material that has a directional weave so that two layers may be placed adjacent to each other and the weave of the first layer is substantially perpendicular to the weave of the second layer. This will create channels for the air to flow between the desiccant sheets. In one particularly preferred embodiment, the gas flow channel includes an extruded net-like material having a directional orientation that allows the gas stream to pass from the inlet to the outlet. The flow channels may also simply be the vacant air spaces between the desiccant material, such as when the desiccant is in powder or granular form and is disposed between layers of PCM.

An embodiment of a device for water adsorption and cooling in accordance with the present invention is illustrated in FIG. 1. The water extraction device 110 includes a phase-change material 112, which is encapsulated in a fluid diffusion barrier (not shown) and desiccant layers 116, located proximal to and in thermal communication with the phase-change material. The desiccant 116 is in rigid sheet form, as described above, defining gas flow channels 114 between the sheets. A rigid gas permeable material 124 is disposed between desiccant layers to maintain separation of the desiccant layers while permitting gas to flow through the channels 114. A gas stream that includes water vapor enters the cooling device 110 via the gas stream inlet 118 and flows through channels 114. The water vapor in the gas stream is adsorbed by contacting the desiccant 116 and a dehumidified gas stream exits the device 110 at the gas stream outlet 119. The heat of adsorption produced by the desiccant 116 is advantageously extracted by the phase-change material 112. A water impermeable envelope 120 encompasses the water extraction device and prevents atmospheric water vapor from entering the device before activation. A battery-operated fan 122 can be used to deliver a gas stream to the device 110. It will be appreciated that the fan or other device used to move the gas stream can be disposed at virtually any location with respect to the device.

Figure 2:
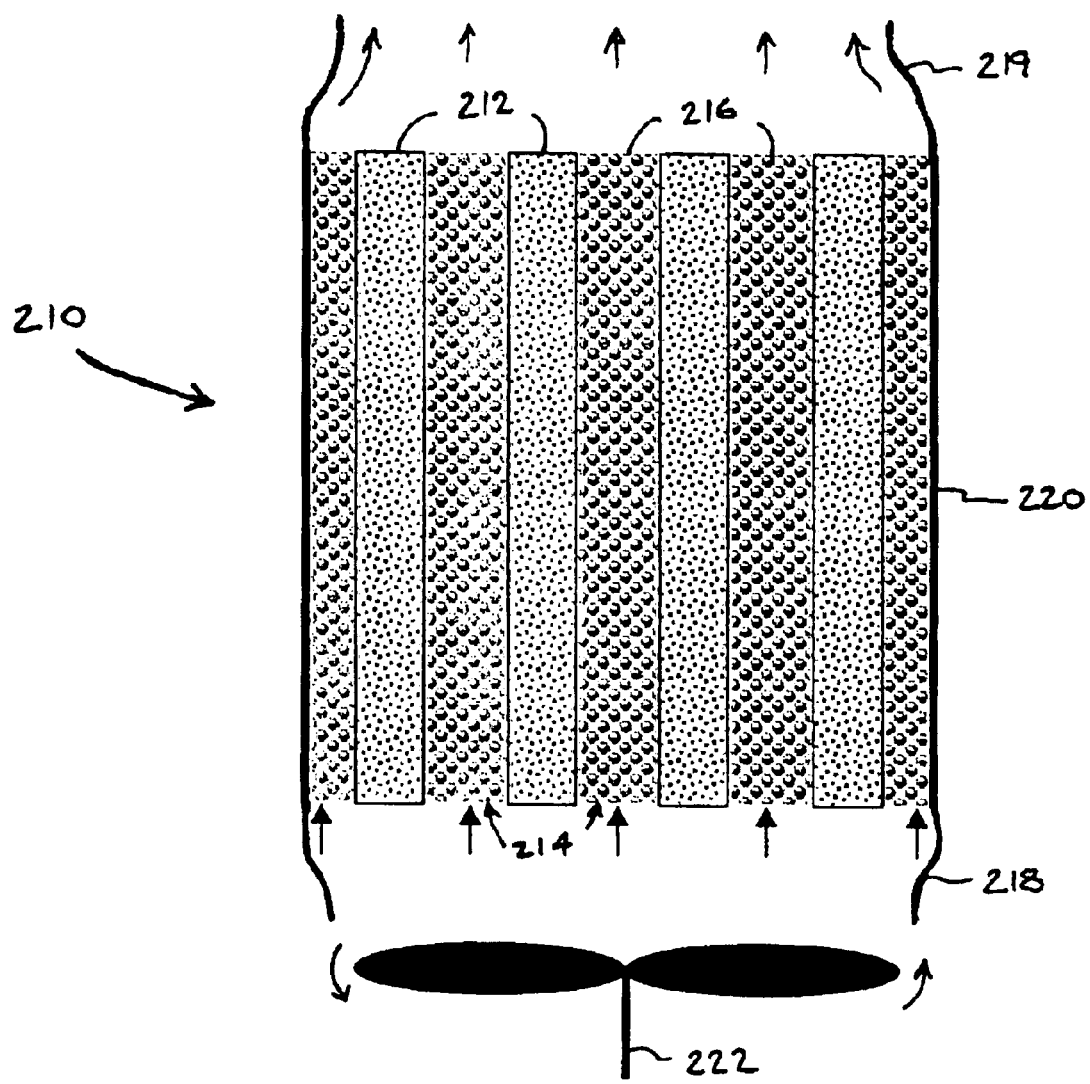
FIG. 2 illustrates a cross-section view of a water adsorption device according to an embodiment of the present invention.

An alternative embodiment of the water adsorption device in accordance with the present invention is illustrated in FIG. 2. The device 210 includes a phase-change material 212, which is encapsulated in a fluid diffusion barrier (not shown), and desiccant layers 216 located proximal to and on opposing sides of the phase-change material 212. In this embodiment, the desiccant is in loose form, such as a powder or granules loosely packed in the gas flow channels 214 defined by the phase-change material 212. A gas stream enters the device 210 at the gas stream inlet 218. The water vapor in the gas stream is adsorbed by contacting the desiccant 216 and a dehumidified gas stream exits the device 210 at the gas stream outlet 219. The heat of adsorption produced by the desiccant 216 is extracted by the phase-change material 212. A water impermeable envelope 220 encompasses the water extraction device and prevents atmospheric water vapor from entering the device before activation. A fan 222 or similar device can be used to deliver the gas stream to the water absorption device 210.

The water extraction device may be activated by any means known to those skilled in the art. For example, the water extraction device may be enclosed by a vapor and liquid impermeable envelope, as described above, and the inlet and outlet of the device may be enclosed by a removable, impermeable film. When the device requires use, the user removes the impermeable film from the device thereby enabling vapor communication between the device and its surrounding environment.

Alternatively, the device may incorporate a valve between the gas inlet and the desiccant. As recognized by those skilled in the art, the valve may be any device which prevents fluid (gas or liquid) communication between the desiccant and the ambient environment when it is desired that the device be inactive, but enables fluid communication when the device is activated. Preferably, the valve is lightweight and compact in size to minimize the overall weight and size of the water extraction device.

In one embodiment of the present invention, a water adsorption device is utilized with an enclosure or a garment to provide dehumidification and/or cooling to the enclosure or the garment, as applicable.

According to one embodiment of the present invention, a climate-controlled enclosure is provided that includes at least a first wall member defining an enclosed space and a water extraction device in fluid communication with the enclosed space. As used herein, an enclosed space is one where the flow of air into and out of the space is generally restricted during use of the enclosure, however the enclosure is not necessarily completely sealed-off from the exterior environment. For example, a common tent is one example of an enclosure that is used to shelter or protect persons for extended periods of time. The enclosure could also be garment worn by a user, such as a Hazmat suit. The water adsorption device according to this embodiment is adapted to extract water vapor from the gas stream entering the device inlet and provide the dried gas stream to the enclosure.

Figure 3:
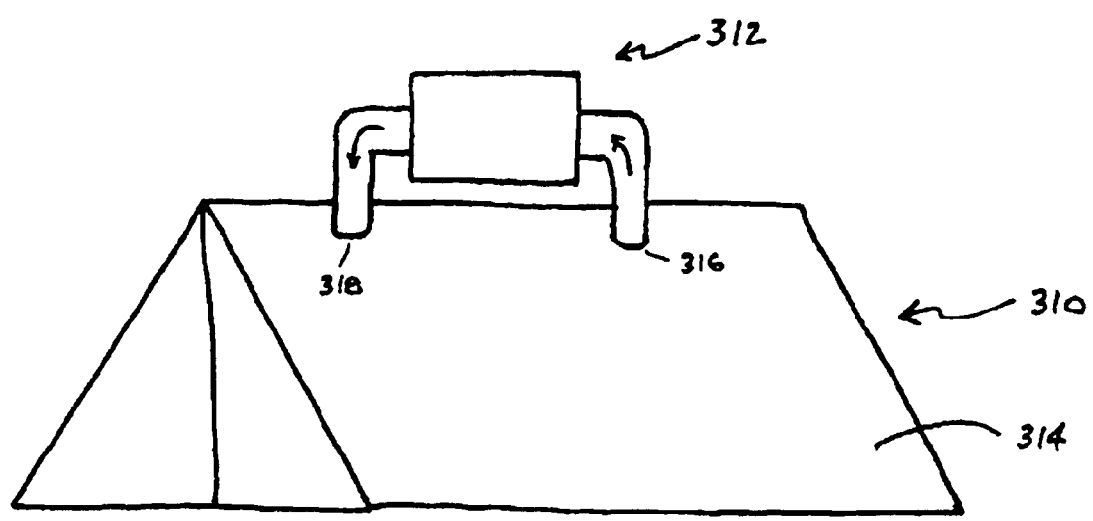
FIG. 3 illustrates a perspective view of an enclosure incorporating a water adsorption device according to an embodiment of the present invention.

A climate-controlled enclosure according to one embodiment of the present invention is illustrated in FIG. 3. The climate-controlled enclosure includes an enclosure 310 defining an enclosed space and a water adsorption device 312 as described with respect to FIGS. 1 and 2. The enclosure 310 includes sidewalls to define the enclosed space. Sidewall 314 includes an outlet port 316 and an inlet port 318 adapted to be connected to the cooling device 312. During use, a stream of air is extracted from the enclosed space of the enclosure 310 through the outlet port 316 and is passed into the device 312 where water vapor is removed from the air. The dried air stream is then returned to the enclosure through inlet port 318.

The device may be incorporated into the enclosure in any manner which enables the device to be in vapor communication with the enclosed space. For example, the device can be partially or wholly disposed within the enclosed space. Also, the inlet of the device can be in fluid communication with the ambient air, rather than the enclosed space, to provide fresh, dry air to the enclosure.

Figure 4:
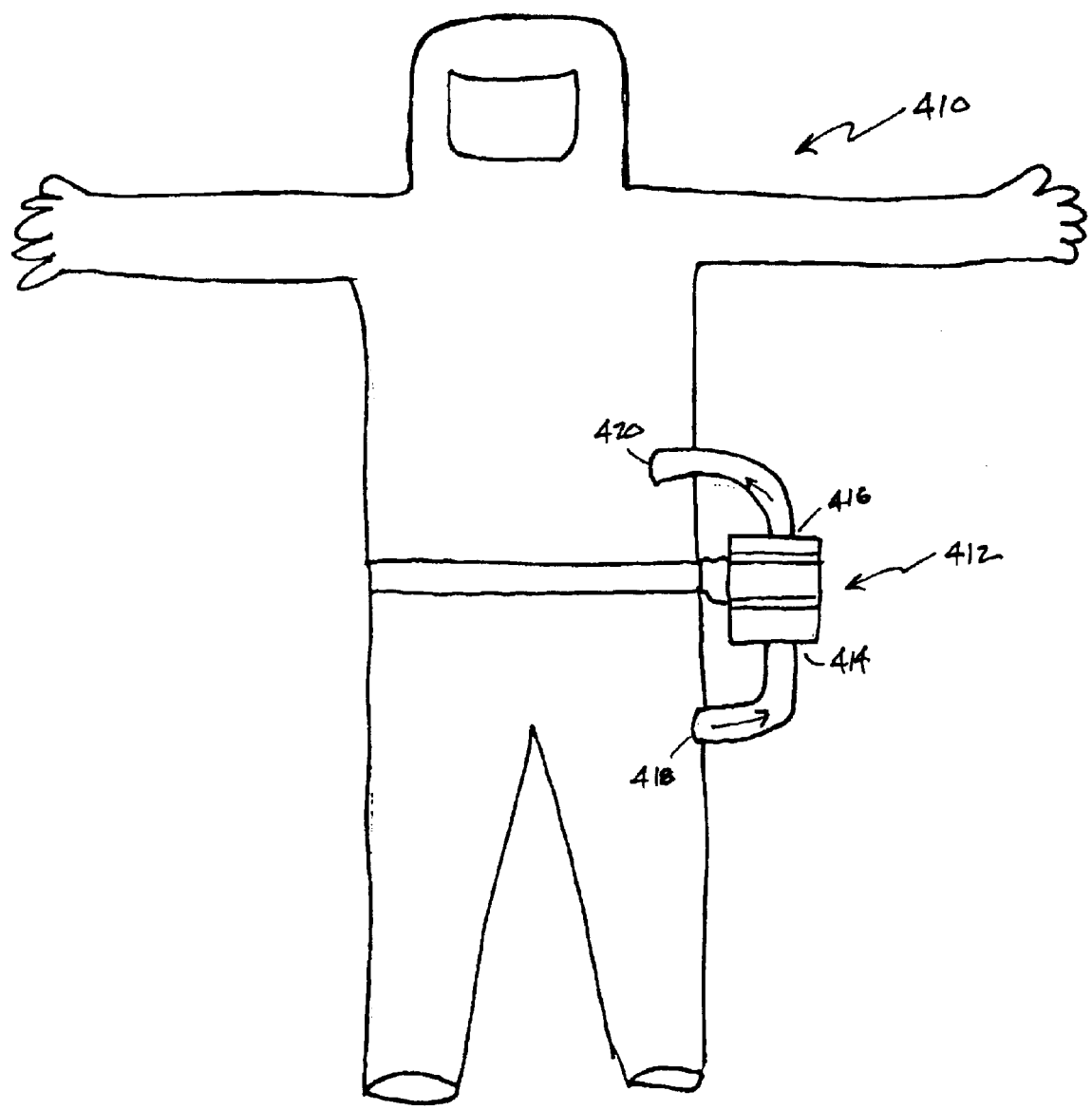
FIG. 4 illustrates a perspective view of a sealed garment incorporating a water adsorption device according to an embodiment of the present invention.

FIG. 4 illustrates another climate-controlled enclosure according to an embodiment of the present invention where the climate-controlled enclosure is a sealed garment worn by the user. As used herein, the term "garment" refers to any article wearable by a user, including but not limited to, sealed garments such as space suits, hazardous material suits and chemical-biological warfare suits, and traditional garments, such as t-shirts, vests and the like. Referring to FIG. 4, the climate-controlled enclosure 410 is worn by a user and substantially encloses the user within the enclosure 410. In a preferred embodiment, the enclosure is substantially liquid and vapor impermeable, such as a hazardous material suit. The enclosure includes a water adsorption device 412 as described with respect to FIGS. 1 and 2 for providing a climate-controlled environment to the enclosure. The device 412 is in fluid communication with the interior of the enclosure. Device 412 includes an inlet 414 and an outlet 416. The inlet 414 is in fluid communication with an outlet 418 on the enclosure. The outlet 416 of the device is connected to an inlet 420 which is in fluid communication with the interior of the enclosure. Thus, air can be extracted from the enclosure through outlet 418 and passed into the device 412. The device 412 removes water vapor from the gas stream and returns it to the user through inlet 420. The cooling device 412 can be attached to the user, such as by attaching to a belt or any similar means. It is also preferable that the device be readily removable from the garment. It will also be appreciated that the device can be disposed wholly or partially within the enclosure. By removing water vapor (e.g., perspiration) from the interior of the enclosure 410, the user is cooled due to the evaporation and removal of water from within the enclosure.

Figure 5:
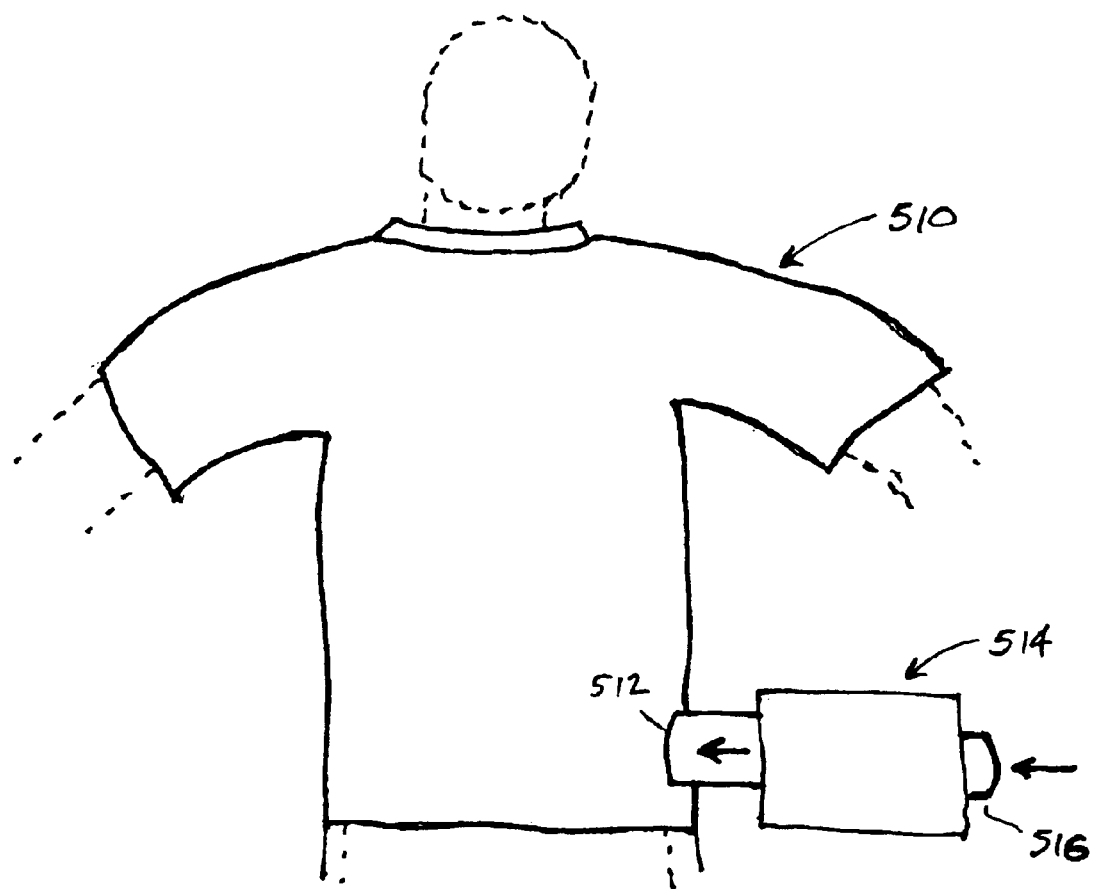
FIG. 5 illustrates a perspective view of a garment incorporating a water adsorption device according to an embodiment of the present invention.

FIG. 5 illustrates an alternative embodiment of a garment according to the present invention. The garment 510 is adapted to be worn by a user and includes an inlet 512 adapted to be connected to the outlet of a cooling device 514. In the embodiment illustrated in FIG. 5, the inlet 516 of the cooling device 514 is in fluid communication with ambient air. Thus, ambient air can be drawn into the cooling device 514 through inlet 516. Water vapor is extracted from the ambient air into the cooling device 514 and the gas stream is then provided through the inlet port 512 to the interior of the garment worn by the user. The user is cooled by the provision of the dry air against the body of the user wearing the garment. The dry air advantageously dries perspiration on the body of the user, thereby providing a cooling effect.

Preferably, the cooling device can be easily removed from the enclosure or garment with little or no adverse affect on the enclosure or garment. For example, the cooling device may include a casing enclosing the device, whereby the casing is designed to fit interchangeably with the enclosure or garment. For example, the casing can include a male fitting which is adapted to fit within a female fitting, wherein the female fitting is incorporated into the enclosure and is in vapor communication with the internal environment of the enclosure. When the female and male fittings are combined, they create a fluid communication path between the enclosure and the cooling device. Preferably, the female and male fittings also, when combined, create a hermetically sealed enclosure with respect to the outside environment thereby preventing fluid communication between the cooling device and the outside environment and also preventing fluid communication between the enclosure and the outside environment. This is especially significant in the case of Hazmat suits, described above, as persons working in Hazmat suits generally desire to avoid fluid communication with the outside environment.

In one embodiment, the device includes actuator means for actuating the cooling device. As noted above, the cooling device is preferably encased in a water-impermeable enclosure. The actuator device can puncture the water-impermeable enclosure thereby enabling vapor communication to the cooling device. The actuating means can be any means known to those skilled in the art which achieves the goal of puncturing the water-impermeable enclosure of the cooling device.

Preferably, the cooling device is removable so that it may be readily removed from the enclosure or garments. In one preferred embodiment, the cooling device is removable from the enclosure without allowing fluid communication with the outside environment.

Generally, the water adsorption is enhanced by creating a negative pressure differential across the flow channel(s). This can be done by the use of a fan, but can also be accomplished by any means which achieves the same effect. The enclosure may be any type of enclosure which requires cooling and which generally is used by persons for extended periods of time.

After use of the water extraction device, the device can optionally be regenerated for further use. Specifically, the device can be treated to desorb water from the desiccant so that the device can be re-used. Alternatively, the device can be disposable whereby a new device is installed on the garment or enclosure for subsequent use.

EXAMPLES

The following examples illustrate the fabrication of water extraction devices according to the present invention.

Preparation of Modified Carbon Desiccant Sheets

The carbon paper used in the examples is a flexible sheet 2–3 mm thick available from Mead-Westvaco, South Lee, Mass. The carbon paper includes 50% SA activated carbon and 50% binder. Lithium chloride (LiCl, available from Sigma Aldrich, Milwaukee, Wis.), is Impregnated into the carbon contained in the paper using a method similar to the one described in U.S. Pat. No. 6,559,096. However, since the manufacturing process causes the carbon paper to be hydrophobic, the paper must be pre-treated with a surfactant. The treatment used is a mixture of 50% deionized water 150% methanol. This mixture is sprayed uniformly onto the paper surface until the surface is just moistened. The sheet can now be impregnated with a mixture that contains the desired amount of salt dissolved into a 50% deionized water/50% methanol mixture by spraying or brushing onto the surface. A mixture containing a salt dissolved into water alone will not wick into the hydrophobic carbon paper. When the pore volume of the carbon sheet has been filled, it is observed that the salt/water/alcohol mixture no longer wicks into the surface. If a higher loading of salt is desired than was obtained with one wicking step, the paper sheet is placed in a 50° C. oven for several hours to dry the bulk of the liquid out of the pores and the pretreatment and wicking steps are repeated. Once the desired loading is achieved, the sheet is placed in a 70° C. oven under vacuum overnight to complete drying. After the sheet has been dried under vacuum, it is kept in a sealed container or handled in a nitrogen environment to prevent the sheet from absorbing atmospheric water.

Preparation of Phase Change Material Bags

The bags containing the phase change material (PCM) are made of any material capable of holding the PCM under vacuum for an extended period of time. The phase change material is measured into a bag sealed on three sides and the bag is evacuated to about 15 mbar. The evacuated PCM in its bag is then pressed so that it is flat and maximizes the contact area the PCM will have with the carbon paper desiccant sheets.

Flow Channel Material

To keep the carbon desiccant sheets separated in the device and maintain flow channels, two layers of a flow channel material comprising a plastic mesh material are used. The plastic mesh material is about 1–2 mm thick so that two layers will be 24 mm thick. Ideally, the mesh material should have a directional weave so that the two layers may be placed so that the weave direction of the first layer is substantially perpendicular to the weave direction of the second layer. This will create channels for the air to flow between the sheets of carbon paper.

The layers of PCM, flow channel material, and carbon sheets are assembled as illustrated in FIG. 1. If the sides of the device terminate with a PCM (as opposed to terminating with a flow channel as illustrated in FIG. 1), only one-half of the amount of PCM is needed on the sides since it is cooling only one carbon sheet desiccant layer.

Example 1

Modified Carbon with PCM

This device includes 12 layers of modified carbon, 7 PCM bags, and 12 layers of flow channel material. All layers are a finished size of 10 cm×15 cm. The carbon sheets each weigh about 7.2 grams, 50% of which is carbon. For a 50% LiCl/50% carbon loading, a total of 3.6 grams of LiCl is impregnated into each sheet. The 3.6 grams of LiCl is dissolved into 8.5 ml of 50% deionized water 150% methanol. The carbon sheet is pre-treated with 0.5 ml of 50% deionized water 150% methanol on each side. While the sheet is still moist, a total of 3 ml of the salt/water/alcohol mixture is wicked into the sheet. Then the sheet is placed in a 50° C. oven for at least two hours to dry. The sheet is then wicked a second time (after pre-treating) with about 3 ml of salt/water/alcohol mixture. The sheet is again dried at 50° C. for at least two hours, then again pre-treated and wicked with the remaining solution. The sheet is now ready for final drying at 70° C. in a vacuum oven overnight. The PCM bags are made of metallized polyethylene terephthalate (PET) with a polyethylene seal layer (Amcor Flexibles, United Kingdom). The measurements from inside seal to inside seal are about 15 cm×15 cm. Five of these bags are filled with 106 grams of disodium sulfate decahydrate ($Na_2SO_4 \cdot 10H_2O$, available from Jost Chemical, St. Louis, Mo.) The other two bags are filled with 53 grams of the PCM to form the sidewall pieces.

Twelve pieces of flow channel material (Delstar, Austin, Tex.) are cut and arranged in pairs so that the weave on one layer is perpendicular to the weave on the second layer. The carbon sheets, PCM bags, and flow channel are assembled under a nitrogen environment to prevent the modified carbon sheets from adsorbing water. Two 10 cm×15 cm Lexan polycarbonate pieces (Regal Plastics, Albuquerque, N. Mex.) are placed on the top and the bottom of the stack and bound together with duct tape.

Example 2

Modified Carbon with No PCM

This device has 12 layers of modified carbon and 12 layers of flow channel material. All layers are a finished size of 10 cm×15 cm. The carbon sheets each weigh about 7.2 grams, 50% of which is carbon. For a 50% LiCl 150% carbon loading, a total of 3.6 grams of LiCl is impregnated into each sheet. The 3.6 grams of LiCl is dissolved into 8.5 ml of 50% deionized water/50% methanol. The carbon sheet is pre-treated with 0.5 ml of 50% deionized water/50% methanol on each side. While the sheet is still moist, a total of 3 ml of the salt/water/alcohol mixture is wicked into the sheet. Then the sheet is placed in a 50° C. oven for at least two hours to dry. The sheet is then wicked a second time (after pre-treating) with about 3 ml of salt/water/alcohol mixture. The sheet is again dried at 50° C. for at least two hours, then again pre-treated and wicked with the remaining solution. The sheet is now ready for its final drying at 70° C. in a vacuum oven overnight. Twelve pieces of flow channel material are cut and arranged in pairs so that the weave on one layer is perpendicular to the weave on the second layer. The carbon sheets and flow channel material are assembled under a nitrogen environment to prevent the modified carbon sheets from adsorbing water. Two Lexan polycarbonate pieces are placed on the top and the bottom of the stack and bound together with duct tape.

Example 3

Unmodified Carbon with PCM

This device includes 12 layers of unmodified carbon, 7 PCM bags, and 12 layers of flow channel material. All layers are a finished size of 10 cm×15 cm. The carbon sheets each weigh about 7.2 grams, 50% of which is carbon. The sheets are dried at 70° C. overnight in a vacuum oven to remove water. The PCM bags are made of Rexam. The measurements from inside seal to inside seal are about 15 cm×15 cm. Five of these bags are filled with 106 grams of sodium sulfate decahydrate $Na_2SO_4.10H_2O$. The other two bags are filled with 53 grams of the PCM for the sidewall pieces. Twelve pieces of flow channel material are cut and arranged in pairs so that the weave on one layer is perpendicular the weave on the second layer. The carbon sheets, PCM bags, and flow channel material are assembled under a nitrogen environment to prevent the carbon sheets from adsorbing water. Two Lexan polycarbonate pieces are placed on the top and the bottom of the stack and are bound together with duct tape.

Example 4

Modified Carbon with PCM

This device includes 12 layers of modified carbon, 7 PCM bags, and 12 layers of flow channel material. All layers are a finished size of about 25 cm×25 cm. The carbon sheets each weigh about 30 grams, 50% of which is carbon. For a 50% LiCl/50% carbon loading, a total of 15 grams of LiCl is impregnated into each sheet. The 15 grams of LiCl is dissolved into 35 ml of –50% deionized water 150% methanol. The carbon sheet is pre-treated with 2 ml of 50% deionized water/50% methanol on each side. While the sheet is still moist, a total of 12 ml of the salt/water/alcohol mixture is wicked into the sheet. Then the sheet is placed in a 50° C. oven for at least two hours to dry. The sheet is then wicked a second time (after pre-treating) with about 12 ml of salt/water/alcohol mixture. The sheet is again dried at 50° C. for at least two hours, then again pre-treated and wicked with the remaining solution. The sheet is now ready for final drying at 70° C. in a vacuum oven overnight. The PCM bags are made of Rexam. The measurements from inside seal to inside seal are about 25 cm×25 cm. Five of these bags are filled with 424 grams of sodium sulfate decahydrate. The other two bags are filled with 212 grams of the PCM for the end pieces. Twelve pieces of flow channel material are cut and arranged in pairs so that the weave on one layer is perpendicular to the weave on the second layer. The carbon sheets, PCM bags, and flow channel material are assembled under a nitrogen environment to prevent the modified carbon sheets from adsorbing water. Two Lexan polycarbonate pieces are placed on the top and the bottom of the stack and bound together with duct tape.

While various embodiments of the present invention have been described in detail, it is apparent that modifications and adaptations to those embodiments will occur to those skilled in the art. It is to be expressly understood, however, that such modifications and adaptations are within the scope of the present invention. Further, it should be recognized that any feature of any embodiment disclosed herein can be combined with any other feature of any other embodiment in any combination.

What is claimed is:

1. A personal cooling device, comprising:
    a) a garment adapted to be worn by a user and comprising a garment inlet adapted to receive a gas stream flow and pass the gas stream flow to an interior of said garment when worn by a user; and
    b) a cooling device in fluid communication with said garment inlet and adapted to provide a gas stream flow to said inlet, said cooling device comprising:
        i) a cooling device inlet;
        ii) a cooling device outlet adapted to provide a gas stream to said garment interior;
        iii) at least a first flow channel disposed between said cooling device inlet and said cooling device outlet;
        iv) a desiccant in vapor communication with said first flow channel; and
        v) a phase-change material in thermal communication with said desiccant.

2. A personal cooling device as recited in claim 1, wherein said garment further comprises a garment outlet in fluid communication with said cooling device inlet.

3. A personal cooling device as recited in claim 2, wherein said garment defines a sealed enclosure for providing a microclimate to a user.

4. A personal cooling device as recited in claim 3 wherein said garment is a hazardous materials suit.

5. A personal cooling device as recited in claim 1, wherein said cooling device inlet is in fluid communication with ambient air during operation of said cooling device.

6. A personal cooling device as recited in claim 1, wherein said desiccant is selected from the group consisting of zeolites, barium oxide, magnesium perchlorate, calcium sulfate, calcium oxide, activated carbon, calcium chloride, glycerine, silica gel, alumina gel, calcium hydride, phosphoric anhydride, phosphoric acid, potassium hydroxide, sodium sulfate, activated carbon, modified carbons and combinations thereof.

7. A device as recited in claim 6, wherein said desiccant comprises a porous support structure having a metal salt impregnated onto said porous support.

8. A device as recited in claim 7, wherein said metal salt is selected from the group consisting of calcium chloride, lithium chloride, lithium bromide, magnesium chloride, calcium nitrate, potassium fluoride and combinations thereof.

9. A personal cooling device as recited in claim 1, wherein said phase-change material has a transition temperature of from about 10° C. to about 80° C.

10. A personal cooling device as recited in claim 1, wherein said phase-change material has a volumetric energy density of at least about 200 $J/cm^3$.

11. A personal cooling device as recited in claim 1, wherein said phase-change material is selected from the group consisting of sodium sulfate decahydrate, disodium hypophosphate dodecahydrate, barium hydroxide octahydrate, paraffins and combinations thereof.

12. A personal cooling device as recited in claim 1, wherein said cooling device further comprises a fluid diffusion barrier disposed between said desiccant and said phase-change material.

13. A personal cooling device as recited in claim 1, wherein the ratio of mass of desiccant to mass of phase-change material is not greater than about 0.10.

14. A personal cooling device as recited in claim 1, wherein the cooling device is substantially encapsulated by a water impermeable casing prior to activation thereof.

15. A personal cooling device as recited in claim 1, wherein said cooling device is substantially encapsulated by a thermal insulation material.

16. A personal cooling device as recited in claim 15, wherein said thermal insulation material is selected from the group consisting of polymer foams, fiberglass, open-cell foam, vacuum insulation and combinations thereof.

17. A personal cooling device as recited in claim 1, wherein said cooling device further comprises a fan adapted to move a gas stream through said first flow channel.

* * * * *

UNITED STATES PATENT AND TRADEMARK OFFICE
CERTIFICATE OF CORRECTION

PATENT NO. : 6,858,068 B2  
DATED : February 22, 2005  
INVENTOR(S) : Smith et al.

It is certified that error appears in the above-identified patent and that said Letters Patent is hereby corrected as shown below:

<u>Title page,</u>  
Item [57], ABSTRACT,  
Line 4, delete "micrlimate" and insert therefor -- micro-climate --.

Signed and Sealed this

Seventeenth Day of May, 2005

JON W. DUDAS  
*Director of the United States Patent and Trademark Office*

UNITED STATES PATENT AND TRADEMARK OFFICE
CERTIFICATE OF CORRECTION

PATENT NO. : 6,858,068 B2
DATED : February 22, 2005
INVENTOR(S) : Smith et al.

It is certified that error appears in the above-identified patent and that said Letters Patent is hereby corrected as shown below:

Column 5,
Line 33, delete "T mperature", and insert therefor -- Temperature --.

Column 13,
Line 25, after "perpendicular", insert -- to --.

Signed and Sealed this

Twenty-sixth Day of July, 2005

JON W. DUDAS
*Director of the United States Patent and Trademark Office*